United States Patent [19]

Mehlau et al.

[11] Patent Number: 5,301,575
[45] Date of Patent: Apr. 12, 1994

[54] TOOL FOR VENTING HYDRAULIC SYSTEMS

[76] Inventors: Hans-Joachim Mehlau, Grabbestrasse 10, 5650 Solingen 11; Dieter Hiedel, Eschensiepen 57, 5600 Wuppertal 2, both of Fed. Rep. of Germany

[21] Appl. No.: 46,967

[22] Filed: Apr. 15, 1993

[30] Foreign Application Priority Data

May 11, 1992 [DE] Fed. Rep. of Germany ... 9206321[U]

[51] Int. Cl.$^5$ ............................................. B25B 13/00
[52] U.S. Cl. .................. 81/124.7; 81/121.1; 188/352; 251/148
[58] Field of Search ............ 81/52, 121.1, 124.3, 81/124.7; 188/352, 1.5; 251/148; 137/327

[56] References Cited

U.S. PATENT DOCUMENTS

| | | | |
|---|---|---|---|
| 3,677,513 | 7/1972 | Truelove | 81/121.1 |
| 3,809,354 | 5/1974 | Truelove | 81/121.1 |
| 3,855,882 | 12/1974 | Wittmann | 81/124.7 |

FOREIGN PATENT DOCUMENTS 89024834 3/1989 Fed. Rep. of Germany .

Primary Examiner—James G. Smith
Attorney, Agent, or Firm—Lowe, Price, LeBlanc & Becker

[57] ABSTRACT

A tool for venting hydraulic systems comprises a tubular tool element which forms a polygonal wrench at a first end. A flexible drain tube extends through the tubular tool element. An end of this drain tube is adapted to be pushed on the nipple of a venting valve. A metal sleeve is located in the flexible drain tube, and a clamping device is provided on the tool element adjacent the metal sleeve for clamping the flexible drain tube to the tool element. This facilitates the assembly and use of the tool. With such a tool, a venting valve is unscrewed to a limited extent through the polygonal wrench such that air is allowed to be vented from the system. The venting valve has a nipple. A flexible drain tube is placed on this nipple. The flexible drain tube prevents uncontrolled outflow of hydraulic liquid from the hydraulic system, thereby preventing contamination of the environment. Instead the hydraulic liquid is guided into a collecting reservoir. Such tools may be used for venting brake systems in vehicles or for venting other hydraulic systems such as heating systems.

10 Claims, 2 Drawing Sheets

TOOL FOR VENTING HYDRAULIC SYSTEMS

Such a tool comprises a tubular tool element which forms a polygonal wrench at a first end. A flexible drain tube extends through the tubular tool element. An end of this drain tube is adapted to be pushed on the nipple of a venting valve.

With such a tool, a venting valve is unscrewed to a limited extent through the polygonal wrench such that air is allowed to be vented from the system. The venting valve has a nipple. A flexible drain tube is placed on this nipple. The flexible drain tube prevents uncontrolled outflow of hydraulic liquid from the hydraulic system, thereby preventing contamination of the environment. Instead the hydraulic liquid is guided into a collecting reservoir. Such tools may be used for venting brake systems in vehicles. Tools of this type may, however, also be used for venting other hydraulic systems such as heating systems.

Such a tool is known from German utility model G 8,902,483. A number of designs are disclosed in this publication. In one design, the flexible drain tube extends loosely through the tubular tool element and can be placed directely onto the nipple of the venting valve. The insertion and the placing of the flexible drain tube is difficult. In another design of the DE-U-G 8,902,483, an adapter of plastics is located within the polygonal wrench and glued in place in the tubular tool element. This adapter, at one end thereof, has a seat to be placed the nipple of the venting valve and, at its other end, forms a nipple coaxial to the tool element. The end of the flexible drain tube is pushed on this nipple. Such an arrangement is complex and expensive. Again it presents the problems to place the end of the flexible drain tube on the nipple. In the prior art tool, a handle is attached through a joint at the end of the tubular tool element remote from the polygonal wrench.

It is the object of the invention to provide a tool of the above mentioned type wherein the assembling and, if necessary, the exchange of the flexible drain tube is simplified.

According to the invention this object is achieved in that a metal sleeve is located in the flexible drain tube, and a clamping device is provided on the tool element adjacent the metal sleeve for clamping the flexible drain tube to the tool element.

Modifications of the invention are subject matter of the depenent claims.

Two embodiments of the invention will now be described in greater details with reference to the accompanying drawings.

Figures 1, 2:
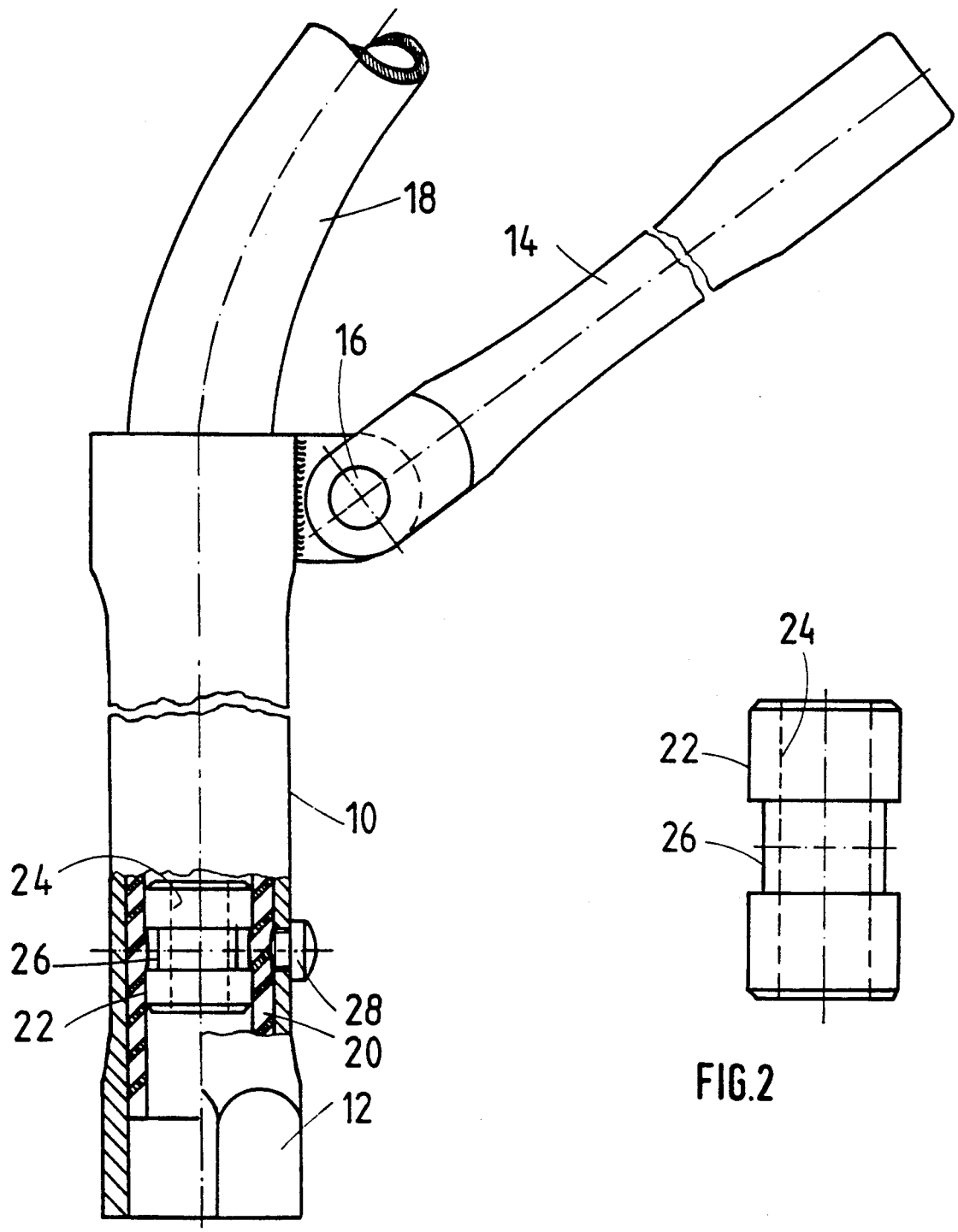
FIG. 1 is a longitudinal sectional view of a tool for venting hydraulic systems.
FIG. 2 is a side elevational view of the metal sleeve in the flexible drain sleeve.
Figure 4:
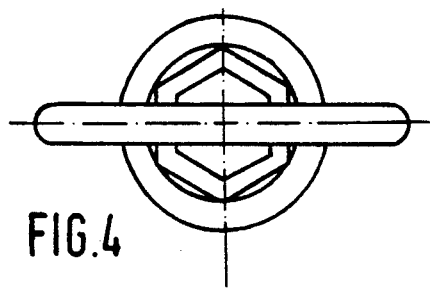
FIG. 4 shows the tool of FIG. 3 as viewed from the bottom of FIG. 3.

Referring to FIG. 1, the tool has a tubular tool element 10. The tool element 10 is a tubular box wrench and has a polygonal wrench 12 in the form of a hexagon at one of his ends, at the bottom in FIG. 1. A handle 14 is attached to the end of the tool element 10 remote from the polygonal wrench 12 by means of a joint 16.

A flexible drain tube 18 is pushed into the tool element 10. The flexible drain tube 18 is made of flexible soft plastics such as PVC. The flexible drain tube 18 ends in the upper part of the polygonal wrench 12. When the polygonal wrench 12 is placed on a venting valve, the end 20 of the flexible drain tube 18 will slide on the nipple provided at the venting valve.

The flexible drain tube 18 is fixedly held in the tool element 10. To this end, a metal sleeve 22 is located in the flexible drain tube 18. The metal sleeve 22 is located slightly inwardly from the end 20. The metal sleeve 22 is illustrated in FIG. 2 at an enlarged scale. The metal sleeve 22 has generally cylindrical shape with a longitudinal bore 24. A circumferential groove 26 is formed in the outer surface of the metal sleeve 22 in the middle thereof. A clamping device in the form of a clamping screw 28 is guided in the wall of the tool element 10 adjacent to the circumferential groove 26. The clamping screw 28 engages the flexible drain tube 18 and presses itself together with the engaged portion of the drain tube 18 into the circumferential groove 26. Due to the clamping screw 28, the flexible drain tube 18 is axially secured in the tool element 10.

It presents no problems to push the metal sleeve 22 into the flexible drain tube up to the desired depth. The flexible drain tube with the metal sleeve can then be pushed into the tubular tool element 10. The flexible drain tube engages the inner wall of the tool element within the tubular section of the tool element, and is guided by this inner wall. Also this step is simply to manage. The flexible drain tube 18 thus pushed-in is fixedly clamped by means of the clamping screw 28. The metal sleeve 22 prevents the flexible drain tube 18 from being compressed during the clamping procedure. The annular groove 26 ensures that the flexible drain tube 18 is axially held. The end 20 of the flexible drain tube 18 is so long that it can elastically be pushed on the nipple of the venting valve. The end 20 is stretched outwardly thereby within the enlarged polygonal wrench 12. However, the end 20 is sufficiently short to make sure that the end 20 is correctly guded, while it is pushed on the nipple.

Figure 3:
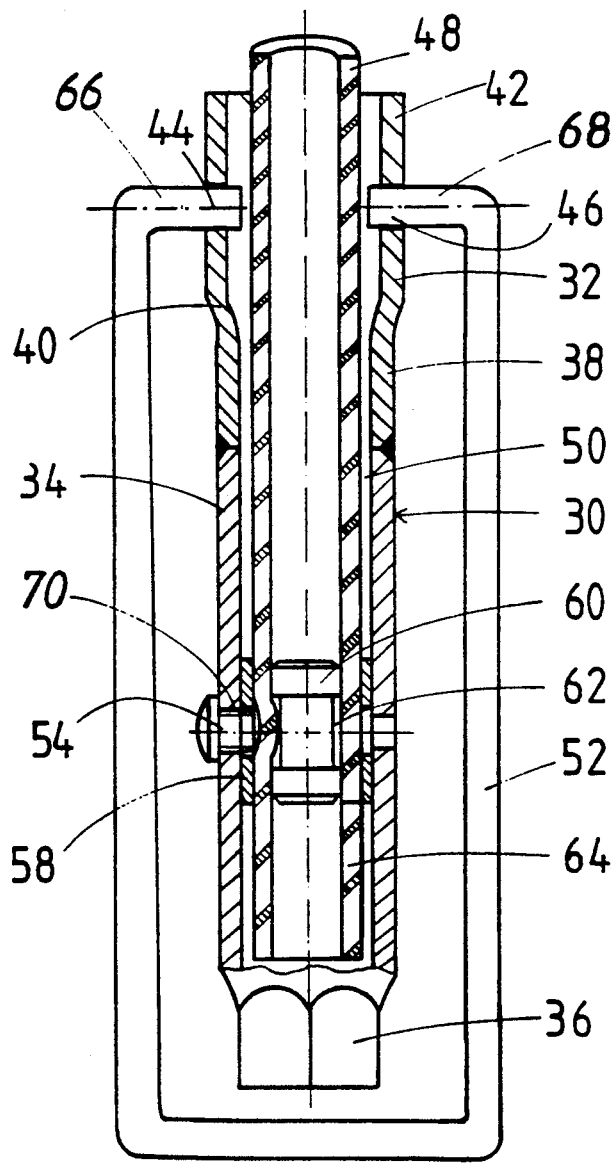
FIG. 3 is a longitudinal sectional view of another embodiment of a tool for venting hydraulic systems.
Figure 5:
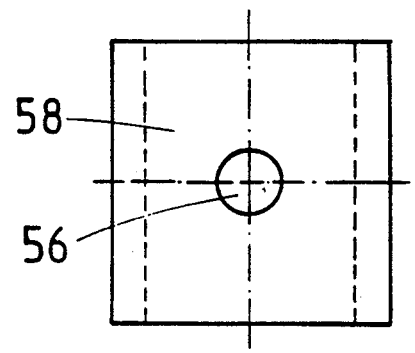
FIG. 5 shows, at an enlarged scale, the bushing between the flexible drain tube and the tool element in the embodiment of FIGS. 3 and 4.

In the embodiment of FIG. 3, a tool element 30 has a larger diameter upper portion 32, a tubular section 34 of circular cross section and a polygonal wrench 36. The upper portion 32 has a section 38 which has the same cross section as the tubular section 34 and is welded thereto. A conical section 40 in which the cross section al area of the upper portion 32 increases, communicates with the section 38. Communicating therewith, the upper portion 32 again has a tubular section 42 of larger diameter. Aligned transversal bores 44 and 46 are provided in the section 42. The ends 48 and 50 of an elastic rectangular wire loop 52 forming a pivotable handle for the tool element engage these transversal bores 44.

The polygonal wrench is formed at the lower end of the tool element, as viewed in FIG. 3. As can be seen from FIG. 3, the polygonal wrench 36 has a free opening of reduced cross sectional area as compared to the tubular section 34. Therefore, a flexible drain tube guided at the inner wall of the tubular section as in FIG. 1, could not extend into the polygonal wrench. Within the tubular section, however, the end of the flexible drain tube could not be radially stretched to a larger diameter by the nipple, on which the tool is placed. Thereby, it would be difficult to establish a sealed connection between nipple and flexible drain tube and to putting the polygonal wrench 36 on the nipple.

Therefore, in the embodiment of FIG. 3, a flexible drain tube 48 of PVC is provided, the outer diameter of which is clearly smaller than the inner diameter of the tubular section 48. Thus, an annulus 50 is formed between the inner wall of the tubular section 34 and the outer surface of the flexible drain tube 48. The flexible drain tube 48 can well be introduced into the tool element thanks to the funnel-type upper portion 32.

A lateral threaded bore 52 is provided in the tubular section 34. A clamping screw 54 is threaded into this threaded bore 52. The clamping screw 54 extends through a lateral aperture 56 of a bushing 58. The bushing 58 is located in the longitudinal bore of the tubular section 34. The outer surface of the bushing 58 engages the inner wall of the section 34. The inner diameter of the bushing 58 is approximately equal to the outer diameter of the flexbible drain tube 48. Of course, there is sufficient clearance such that the flexible drain tube 48 can easily be pushed through the the bushing 58. The edges of the bushing 58 are flared. The bushing 58 is thus held in axial direction by the clamping screw.

Similarly to the embodiment of FIGS. 1 and 2, a metal sleeve 60 is located in the flexible drain tube 48. The metal sleeve 60 has substantially the same shape as the metal sleeve 22 of FIG. 2. The metal sleeve 60 has a circumferential groove 62. The clamping device 54 presses the flexible drain tube 48 into this circumferential groove 62. Therby, the flexible drain tube 48 is held axially in the tubular section 34 of the tool element 30. A free end 64 projects over the metal sleeve 60. In the embodiment of FIG. 3, this free end 64 is located completely within the tubular section 34 and ends in front of the polygonal wrench. The annulus 50 permits, however, the end 64 to be radially strectched, when the tool element 30 is placed on a nipple projecting into the tubular section 34.

We claim:
1. A tool for venting hydraulic systems, comprising:
    (a) a tubular tool element (10;30) forming a polygonal wrench (12;36) at a first end thereof, and
    (b) a flexible drain tube (18;48) having a front end extending into said tool element (10;30) and emerging from a second end of said tool element (10;30), said front end (20;64) of said flexible drain tube being arranged to sealingly engage a nipple of a venting valve, when said tool element is placed with its first end on said nipple,
characterized in that
    (c) a metal sleeve (22;60) is located in said flexible drain tube (18;48), and
    (b) clamping means (28;54) for clamping said flexible drain tube (18;48) to said tool element are provided at said tool element (10;30) adjacent said metal sleeve (22;60).

2. A tool as claimed in claim 1, characterized in that said metal sleeve (22;60) has a circumferential groove (26;62), said clamping means (28;54) being arranged to press a wall portion of said flexible drain tube (18;48) into said circumferential groove (26;62).

3. A tool as claimed in claim 2, characterized in that said clamping means (28;54) comprise a clamping screw guided in said tubular tool element (10;30).

4. A tool as claimed in claim 3, characterized in that said metal sleeve (22;60) and said clamping screw (28;54) are located near said first end, forming the polygonal wrench (12;36), of said tubular tool element (10;30).

5. A tool as claimed in claim 4, characterized in that
    (a) said tool element (10) has a tubular section of circular cross section and a polygonal wrench (12) communicating therewith and having a free opening of larger cross sectional area than said tubular section, at said first end,
    (b) said flexible drain tube (18) engages the inner wall of the tubular section and is guided thereby, and
    (c) said flexible drain tube (18) ends within said polygonal wrench (12).

6. A tool as claimed in claim 1, characterized in that
    (a) the outer diameter of said flexible drain tube is smaller than the inner diameter of the tool element such that an annulus is formed between the tool element and the flexible drain tube, and
    (b) a bushing is located between an inner wall of said tool element and an outer surface of the flexible drain tube adjacent to said metal sleeve.

7. A tool as claimed in claim 6, characterized in that
    (a) said metal sleeve has a circumferential groove,
    (b) said bushing has a radial aperture adjacent to said circumferential groove, and
    (c) said clamping means comprise a clamping screw guided in said tubular tool element, said clamping screw extending through said aperture of said bushing and engaging said circumferential groove of said metal sleeve a wall portion of said flexible drain tube being interposed between said screw and said groove.

8. A tool as claimed in claim 7, characterized in that
    (a) said tool element has a tubular section of circular cross section and a polygonal wrench communicating therewith and having a free opening of smaller cross sectional area than said tubular section, and
    (b) said flexible drain tube ends in front of the polygonal wrench within said tubular section.

9. A tool as claimed claim 1, characterized in that the flexible drain tube consists of PVC.

10. A tool as claimed in claim 1, characterized in that a handle is pivotally mounted at said first end of said tubular tool element remote from said polygonal wrench.

* * * * *